United States Patent
Lu et al.

(10) Patent No.: US 10,899,275 B2
(45) Date of Patent: Jan. 26, 2021

(54) VEHICULAR CAMERA WITH PCB FOCUS TUNING

(71) Applicant: Magna Electronics Inc., Auburn Hills, MI (US)

(72) Inventors: Yuesheng Lu, Farmington Hills, MI (US); Steven V. Byrne, Goodrich, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/451,179

(22) Filed: Jun. 25, 2019

(65) Prior Publication Data
US 2020/0001787 A1    Jan. 2, 2020

Related U.S. Application Data

(60) Provisional application No. 62/711,657, filed on Jul. 30, 2018, provisional application No. 62/696,502, filed on Jul. 11, 2018, provisional application No. 62/690,527, filed on Jun. 27, 2018.

(51) Int. Cl.
| | | |
|---|---|---|
| *B60Q 9/00* | (2006.01) | |
| *B60R 1/12* | (2006.01) | |
| *G08G 1/16* | (2006.01) | |
| *H04N 5/225* | (2006.01) | |
| *B60S 1/56* | (2006.01) | |
| *G01J 1/42* | (2006.01) | |
| *B60R 11/04* | (2006.01) | |

(52) U.S. Cl.
CPC ............. *B60Q 9/008* (2013.01); *B60R 1/12* (2013.01); *B60R 11/04* (2013.01); *B60S 1/56* (2013.01); *G01J 1/4204* (2013.01); *G08G 1/167* (2013.01); *H04N 5/2253* (2013.01); *H04N 5/2254* (2013.01)

(58) Field of Classification Search
CPC ........... B60Q 9/008; B60R 1/12; B60R 11/04; B60R 2011/0026; G08G 1/167; H04N 5/2254; H04N 5/2253; H04N 5/22521; B60S 1/56; G01J 1/4204
See application file for complete search history.

(56) References Cited

U.S. PATENT DOCUMENTS

| | | | |
|---|---|---|---|
| 4,712,879 A | 12/1987 | Lynam et al. | |
| 5,412,510 A | * 5/1995 | Iizuka | ........... G02B 7/008 359/206.1 |
| 5,550,677 A | 8/1996 | Schofield et al. | |
| 5,670,935 A | 9/1997 | Schofield et al. | |

(Continued)

*Primary Examiner* — Jason A Flohre
(74) *Attorney, Agent, or Firm* — Honigman LLP

(57) ABSTRACT

A camera for a vehicular vision system includes a circuit board having a first surface and a second surface opposite the first surface. The circuit board has a first coefficient of thermal expansion (CTE). An imager is disposed at the first surface of the circuit board, and a lens assembly is at the imager. A bend-countering element is disposed at one of the first side and the second side of the circuit board. The bend-countering element has a second CTE that is different from the first CTE of the circuit board. The bend-countering element is selected so that, with the camera disposed at the vehicle, the bend-countering element counters temperature-induced bending of the circuit board to maintain focus of the lens assembly at the imager.

20 Claims, 7 Drawing Sheets

(56) References Cited

U.S. PATENT DOCUMENTS

| | | | |
|---|---|---|---|
| 5,949,331 A | 9/1999 | Schofield et al. | |
| 5,978,017 A | 11/1999 | Tino | |
| 6,151,065 A | 11/2000 | Steed et al. | |
| 6,690,268 B2 | 2/2004 | Schofield et al. | |
| 6,824,281 B2 | 11/2004 | Schofield et al. | |
| 7,038,577 B2 | 5/2006 | Pawlicki et al. | |
| 7,480,149 B2 | 1/2009 | DeWard et al. | |
| 7,595,943 B2 * | 9/2009 | Yuan | G02B 7/028 359/820 |
| 7,720,580 B2 | 5/2010 | Higgins-Luthman | |
| 7,855,755 B2 | 12/2010 | Weller et al. | |
| 7,965,336 B2 * | 6/2011 | Bingle | B60R 1/04 348/374 |
| 8,256,821 B2 | 9/2012 | Lawlor et al. | |
| 8,542,451 B2 | 9/2013 | Lu et al. | |
| 8,994,878 B2 | 3/2015 | Byrne et al. | |
| 9,077,098 B2 | 7/2015 | Latunski | |
| 9,233,641 B2 | 1/2016 | Sesti et al. | |
| 9,277,104 B2 | 3/2016 | Sesti et al. | |
| 9,621,769 B2 | 4/2017 | Mai et al. | |
| 10,207,646 B2 | 2/2019 | Oh | |
| 10,274,812 B1 | 4/2019 | Chen | |
| 2003/0090569 A1 | 5/2003 | Poechmueller | |
| 2007/0146908 A1 * | 6/2007 | Li | G02B 13/0015 359/820 |
| 2009/0244361 A1 | 10/2009 | Gebauer et al. | |
| 2009/0295181 A1 | 12/2009 | Lawlor et al. | |
| 2011/0025850 A1 | 2/2011 | Maekawa et al. | |
| 2011/0298925 A1 | 12/2011 | Inoue et al. | |
| 2013/0183499 A1 * | 7/2013 | Kido | G03F 7/027 428/195.1 |
| 2013/0242099 A1 | 9/2013 | Sauer et al. | |
| 2014/0160284 A1 | 6/2014 | Achenbach et al. | |
| 2014/0226012 A1 | 8/2014 | Achenbach | |
| 2014/0298642 A1 * | 10/2014 | Sesti | G02B 7/04 29/592.1 |
| 2014/0373345 A1 | 12/2014 | Steigerwald | |
| 2015/0015713 A1 | 1/2015 | Wang et al. | |
| 2015/0029337 A1 | 1/2015 | Uchiyama et al. | |
| 2015/0124098 A1 | 5/2015 | Winden et al. | |
| 2015/0222795 A1 | 8/2015 | Sauer et al. | |
| 2015/0266430 A1 | 9/2015 | Mleczko et al. | |
| 2015/0327398 A1 | 11/2015 | Achenbach et al. | |
| 2015/0365569 A1 | 12/2015 | Mai et al. | |
| 2016/0037028 A1 | 2/2016 | Biemer | |
| 2016/0191863 A1 | 6/2016 | Minikey, Jr. et al. | |
| 2016/0243987 A1 | 8/2016 | Kendall | |
| 2016/0268716 A1 | 9/2016 | Conger et al. | |
| 2016/0286103 A1 | 9/2016 | Van Dan Elzen | |
| 2017/0036600 A1 | 2/2017 | Whitehead et al. | |
| 2017/0054881 A1 | 2/2017 | Conger et al. | |
| 2017/0126938 A1 * | 5/2017 | Newiger | H04N 5/2257 |
| 2017/0133811 A1 | 5/2017 | Conger et al. | |
| 2017/0201661 A1 | 7/2017 | Conger | |
| 2017/0280034 A1 | 9/2017 | Hess et al. | |
| 2017/0295306 A1 | 10/2017 | Mleczko | |
| 2017/0302829 A1 | 10/2017 | Mleczko et al. | |
| 2018/0027151 A1 | 1/2018 | Kazama et al. | |
| 2018/0033741 A1 * | 2/2018 | Dubey | H01L 23/585 |
| 2018/0072239 A1 | 3/2018 | Wienecke et al. | |
| 2018/0098033 A1 | 4/2018 | Mleczko et al. | |
| 2019/0121051 A1 | 4/2019 | Byrne et al. | |
| 2019/0124238 A1 | 4/2019 | Byrne et al. | |
| 2019/0124243 A1 | 4/2019 | Mleczko et al. | |
| 2019/0166289 A1 * | 5/2019 | Knutsson | H04N 5/2254 |
| 2019/0306966 A1 | 10/2019 | Byrne et al. | |
| 2020/0010024 A1 | 1/2020 | Sesti et al. | |

* cited by examiner

VEHICULAR CAMERA WITH PCB FOCUS TUNING

CROSS REFERENCE TO RELATED APPLICATIONS

The present application claims priority of U.S. provisional applications, Ser. No. 62/711,657, filed Jul. 30, 2018, Ser. No. 62/696,502, filed Jul. 11, 2018, and Ser. No. 62/690,527, filed Jun. 27, 2018, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras have been proposed for such imaging systems, including cameras of the types described in U.S. Pat. No. 7,965,336 and U.S. Publication No. US-2009-0244361, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a bend-countering element disposed at a side or surface of the circuit board, with the bend-countering element having a coefficient of thermal expansion (CTE) that is different from the CTE of the circuit board. When the camera is disposed at the vehicle and exposed to a high or low temperature, the bend-countering element bends in an opposite direction that the circuit board bends to at least partially counter the bending of the circuit board so as to maintain focus of the camera or limit or reduce or minimize bending of the circuit board and over or under focusing of the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
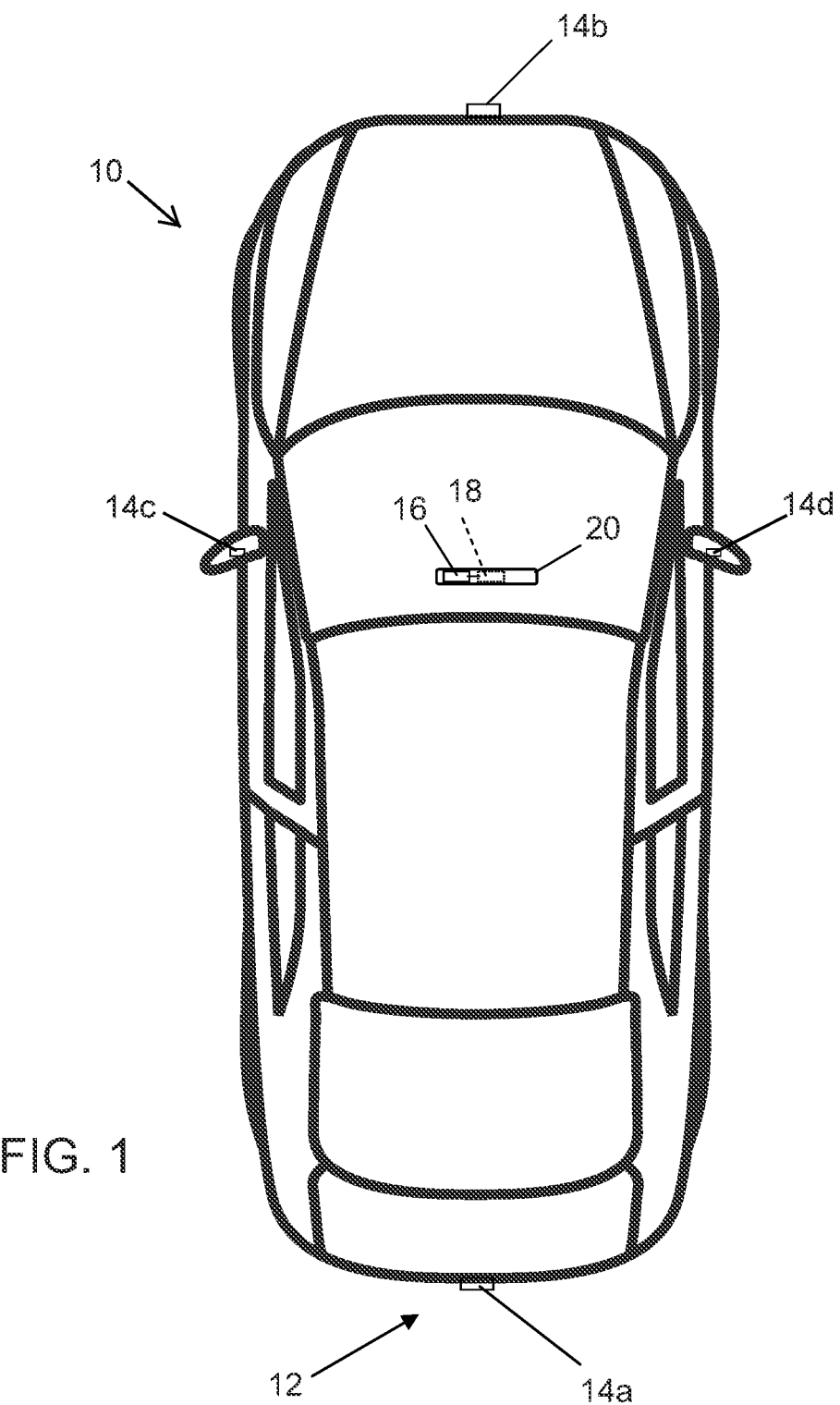
FIG. 1 is a plan view of a vehicle with a vision system that incorporates multiple cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager or imaging device of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The control unit may comprise or may be part of an autonomous vehicle control system, whereby the cameras capture image data that is processed for use in autonomously controlling the vehicle. Autonomous vehicle cameras may require very high levels of focus precision in all environments. Automotive cameras must maintain precise lens-to-imager relative position throughout the full range of operating temperatures. This is challenging because of the various camera assembly material CTEs (Coefficients of Thermal Expansion). The optical performance of the lens may also be a contributor.

Simulations have been performed on the mechanical and optical design to predict changes as accurately as possible. The actual assembly will often still have a five or more microns lens-to-imager shift due to unforeseen behaviors with the components and optics. Further long-term control is often unachievable.

Figure 2:
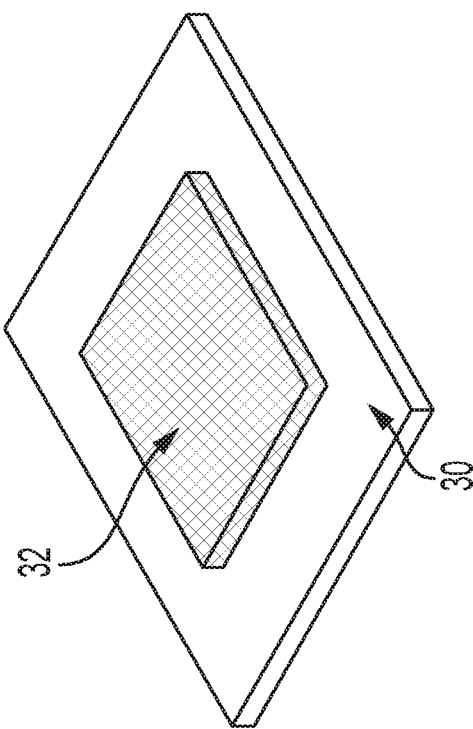
FIG. 2 is a perspective view of a circuit board for a vehicular camera, showing an imager disposed at a surface of the circuit board.
Figure 3:
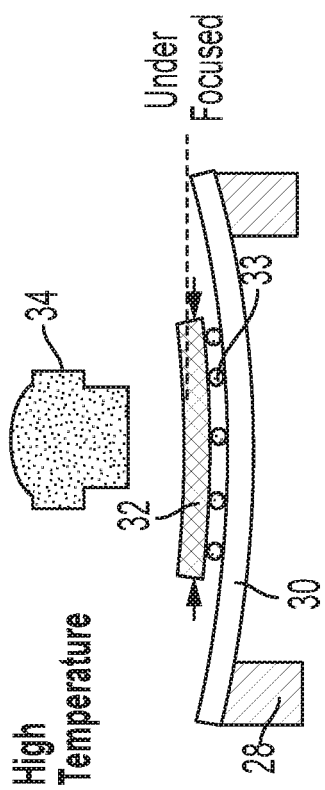
FIG. 3 is a side view diagram of the circuit board and lens of the camera, showing the effects of exposure to high temperature.
Figure 4:
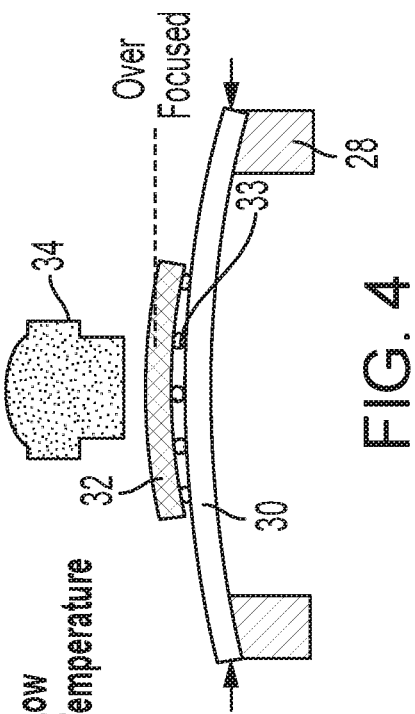
FIG. 4 is another side view diagram of the circuit board and the lens of the camera, showing the effects of exposure to low temperature.

As can be seen with reference to FIGS. 2-4, a printed circuit board (PCB) 30 (such as one of the cameras 14a-d) has a component 32 (such as an imager or imaging device or the like) disposed at a surface thereof (such as affixed at the surface of the PCB via solder balls 33 or the like). The imager 32 comprises a component with a lower CTE (e.g., a ceramic case sensor may have a CTE of less than 10 ppm/° C. (a unit of change in the part per degree Celsius), such as around 6 ppm/° C.) than the higher CTE of the PCB 30 (e.g., an FR4 substrate may have a CTE of greater than 10 ppm/° C., such as around 14 ppm/° C.). In FIG. 3, the PCB and imager are shown flexing or bending downward at the center region (between the side fixed points that are attached at a camera housing 28) away from the lens 34 when the camera is exposed to higher temperatures. This is because the sensor expands less than the PCB in higher temperature conditions, and results in the camera being under focused. Similarly, and such as shown in FIG. 4, the PCB and imager are shown flexing or bending upward at the center region (between the side fixed points that are attached at a camera housing) toward the lens 34 when the camera is exposed to lower temperatures. This is because the PCB substrate expands less than the imager in lower temperature conditions, and results in the camera being over focused.

The present invention offers ways to tune this shifting after the key components in the optical path are designed and attached or fixed relative to one another. The tuning or adjusting provides slight bending of the imager printed circuit board (PCB) in a desirable direction and amount to accommodate or counter the flexing or bending that may otherwise occur when the camera is exposed to extreme high or low temperature. The system or process may provide intentional tuning or bending of the PCB to achieve or maintain enhanced or ideal focus for the particular camera configuration, whereby the PCB may be bent or flexed toward a planar configuration or toward a selected degree of bend to provide the ideal focus for the camera.

Thus, when the camera is disposed at the vehicle, the bend-countering element counters the temperature-induced bending of the circuit board (which may occur due to different CTEs between the imager and the circuit board) to maintain focus of the lens assembly at the imager (so that images imaged by the lens are focused at the image plane of the imager throughout a range of temperatures to which the camera is exposed). The bend-countering element is selected to correct for or counter temperature-induced bending of the circuit board when the camera is exposed to high temperatures (such as, for example, temperatures greater than 40 degrees C. or greater than 60 degrees C. or greater than 80 degrees C.), and/or low temperatures (such as, for example, temperatures below freezing, such as temperatures below 0 degrees C. or below −20 degrees C. or below −40 degrees C.). It is envisioned that aspects of the present invention may be applied to other types of high precision sensors, such as Lidar or magnetic sensors or the like.

Figure 6:
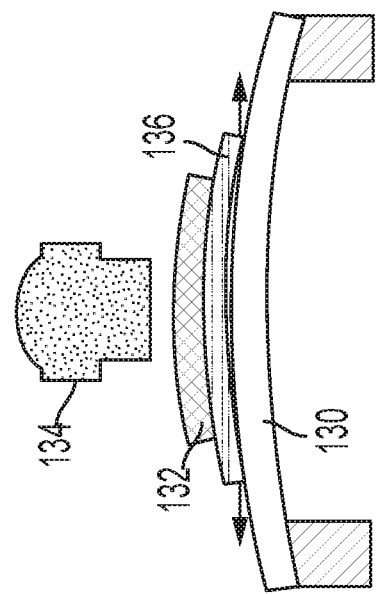
FIG. 6 is a side view diagram of the circuit board and the lens of the camera, showing the effects of exposure to high temperature, which is opposite to the effects shown in FIG. 3.
Figure 5:
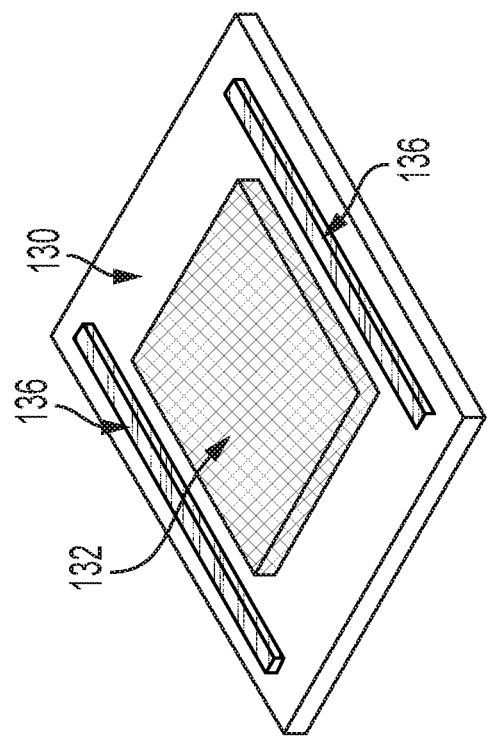
FIG. 5 is a perspective view of a circuit board for a vehicular camera, showing an imager disposed at a surface of the circuit board, with solder strips disposed along the surface of the circuit board in accordance with the present invention.

Referring now to FIGS. 5 and 6, one or more (such as two shown in FIG. 5) solder strips 136 may be disposed at the surface of the PCB substrate 130 (the same surface at which the imager 132 is disposed). The strips of solder may be disposed on the front or back of the PCB as needed during the SMT process (depending on the direction that the PCB is to be bent or curved). The provision of the solder strips can help bend the PCB as needed since the CTE of solder is higher (such as greater than 20 ppm/° C., and such as, for example, about 22 ppm/° C.) than the PCB material. Other types of materials, such as dispensed glue or other suitable material having the desired or selected CTE (relative to the CTE of the PCB substrate material), may also be used for the same purpose. As shown in FIG. 6, the PCB and imager are shown flexing or bending upward at the center region (between the side fixed points that are attached at a camera housing) toward the lens 134 when the camera is exposed to higher temperatures (such as, for example, temperatures greater than 40 degrees C. or greater than 50 degrees C. or greater than 60 degrees C.). This is because the solder expands more than the PCB substrate and the imager in lower temperature conditions. The type and amount of solder may be selected to cause the desired degree of bending to counter the temperature-induced bending that would otherwise occur to the PCB and imager. Optionally, solder strips may instead be applied to or disposed at the back side of the PCB substrate to bend the PCB in the opposite direction. The direction of bend and degree of bend (toward flat or toward a desired curvature to accommodate variations in the camera at extreme temperatures) is dependent on the particular camera configuration.

Figure 8:
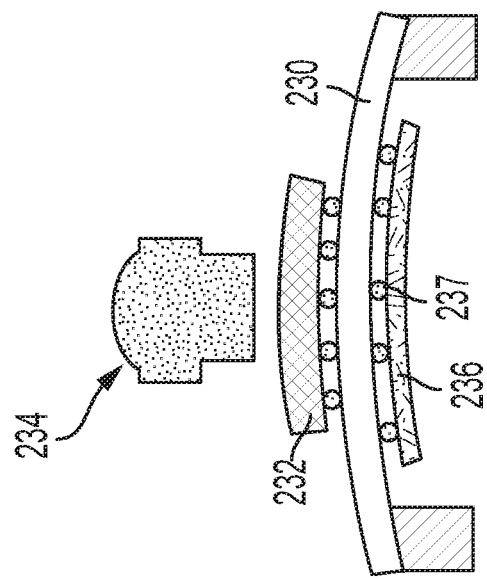
FIG. 8 is a side view diagram of the circuit board and the lens of the camera, showing the effects of exposure to high temperature, which is opposite to the effects shown in FIG. 3.
Figure 7:
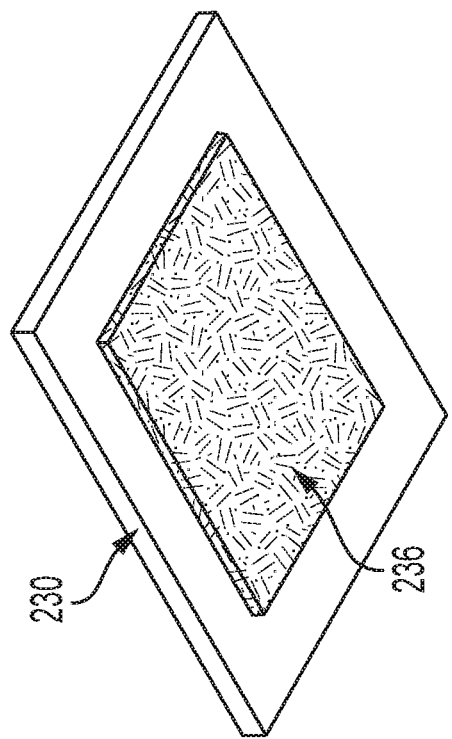
FIG. 7 is a perspective view of a circuit board for a vehicular camera, showing an imager disposed at a surface of the circuit board, with a low coefficient of thermal expansion (CTE) plate disposed along the opposite surface of the circuit board in accordance with the present invention.

Optionally, and with reference to FIGS. 7 and 8, a CTE compensation plate 236 may be disposed at the PCB substrate 230 (at the side opposite from where the imager 232 is disposed), such as via solder balls 237 or the like. The compensation plate 236 may comprise a metal plate with a CTE that is higher or lower than the PCB material (for example, a low CTE plate (e.g., 410 stainless steel) may be soldered onto the PCB and may have a CTE of less than 10 ppm/° C., such as about 9.9 ppm/° C.). As shown in FIG. 8, the PCB and imager are shown flexing or bending upward at the center region (between the side fixed points that are attached at a camera housing) toward the lens 234 when the camera is exposed to higher temperatures. This is because the low CTE plate on the bottom expands less than the PCB substrate in higher temperature conditions. Optionally, a higher CTE plate can be used to bend the PCB in the opposite direction to counter the temperature-induced bending of the PCB.

The compensation plate can be added to the back of the PCB to control bending. The type and size of the plate may be selected to cause the desired degree of bending to counter the bending that would otherwise occur to the PCB and imager. The size and material type will control the amount of bending. Optionally, the plate may be adhesively attached or soldered or otherwise fastened to the PCB. Optionally, other types of non-solderable materials could be adhesively bonded or soldered or otherwise fastened to the PCB to control temperature-induced bending. Optionally, the plate or a frame element may be bonded or soldered or otherwise fastened at the imager side of the PCB to cause or control temperature-induced bending of the PCB and imager in the opposite direction.

Figure 10:
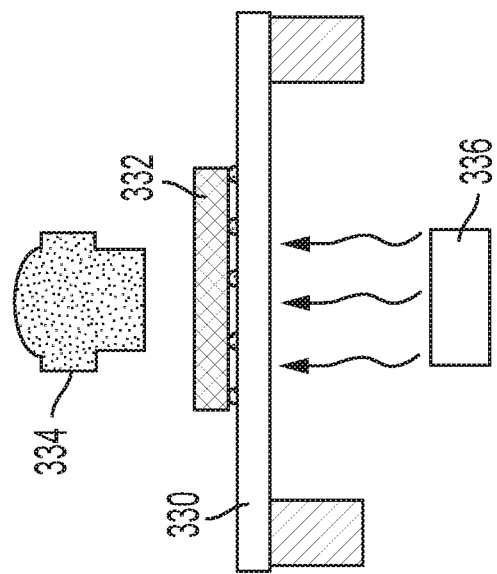
FIG. 10 is a side view diagram of the circuit board and the lens of the camera, showing the effects of the active internal cooling during exposure to high temperature, which reverses the bending of the circuit board shown in FIG. 3.
Figure 9:
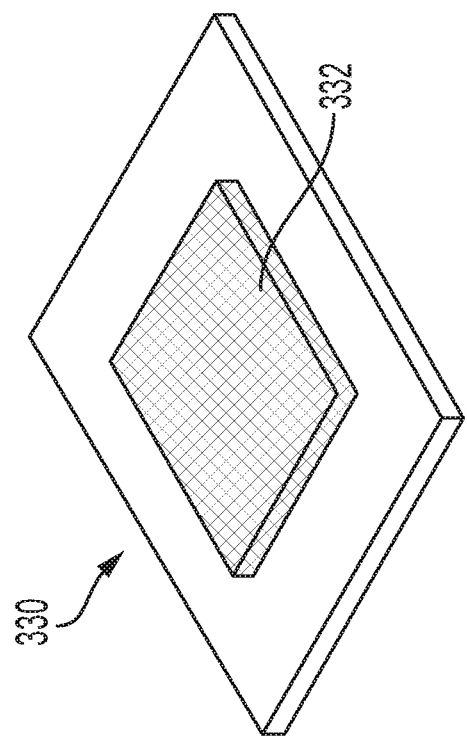
FIG. 9 is a perspective view of a circuit board for a vehicular camera, showing an imager disposed at a surface of the circuit board, with the camera having active internal cooling and/or heating in accordance with the present invention.

Optionally, and with reference to FIGS. 9 and 10, an active internal heating device 336 may be disposed in the camera to actively heat the PCB substrate 330 (at the side opposite from where the imager 332 is disposed). If a PCB has a tendency to bend with temperature change, the amount can be limited or controlled as desired if the PCB temperature is actively controlled. The heating device may comprise a thermal electric device (Peltier device) and can be used to either heat or cool the PCB as needed. The active internal cooling of the PCB by way of a thermal electric cooler (TEC) can bring the assembly back to a condition where different CTEs have less impact. The thermal electric cooler can also be run in reverse to heat the PCB during cold conditions to maintain stability of the PCB and imager relative to the lens 334.

The thermal electric cooler or TEC may be operable to heat or cool selected components of the camera to take into account temperature changes and effects on various camera components (and may optionally utilize aspects of the cameras described in U.S. patent application Ser. No. 16/364,250, filed Mar. 26, 2019 and published Oct. 3, 2019 as U.S. Publication No. US-2019-0306966, which is hereby incorporated herein by reference in its entirety). Optionally, the TEC may be actively controlled to change the focus of the camera regardless of temperature variations and component expansion or contraction due to extreme temperature changes. For example, the TEC may heat or cool the imager circuit board (as discussed above) to move the imager relative to the lens to change the gap between the lens and the imager and thus to change the focus of the lens at the imager, or may heat or cool one or more lens-to-imager positioning elements (that retain the imager PCB relative to the lens to maintain focus of the lens at the imager) to change the gap between the lens and the imager and thus to change the focus of the lens at the imager or to maintain the focus of the lens at the imager by countering temperature-induced bending of the PCB.

The TEC thus provides an active focus or controllable focusing device, which may be operable to adjust the focus of the camera responsive to, for example, processing of image data captured by the camera (to bring the images into sharper focus or to adjust focus to enhance focusing of particular elements present in the field of view of the camera or to provide closer focus or more distant focus depending on the particular application or situation). For example, for a backup camera and during a reversing maneuver of the vehicle, the system may adjust focusing of the camera to closer objects responsive to detection of an object or potential hazard immediately rearward of the vehicle, but may adjust focusing of the camera to further objects or distances when no such objects or potential hazards are detected (to provide a clearer video display of the region rearward of the vehicle for the driver to view during the reversing maneuver). Optionally, the TEC may provide such an active focus feature responsive to a user input or responsive to temperature sensors or the like at the camera. Optionally, the TEC may function to heat or cool other components of the camera that (when heated/expanded or cooled/contracted) may affect the relative position of the lens and imager and thus may affect the focus of the camera.

Optionally, the coefficient of thermal expansion (CTE) of various components (or strips or elements added to various components) may be selected such that the element(s) that the TEC heats/cools may expand/contract more or less than other components to achieve the desired lens-to-imager adjustment. For example, materials with higher or lower CTEs may be selected to expand/contract more or less when the TEC heats/cools, whereby the components work together to adjust the focus of the camera.

Therefore, the present invention provides for counter bending of the PCB and imager via use of different CTE materials or changing the temperature of the PCB and imager. The different CTE materials function to counter the bending of the PCB that may otherwise occur when the camera is exposed to higher or lower temperatures. Optionally, the different CTE materials may function to cause bending of the PCB to accommodate other changes in the camera when exposed to higher or lower temperatures. The camera of the present invention thus maintains focus or enhances focus by the lens at the imager or imaging device, and limits or reduces over or under focusing when the camera is exposed to extreme temperatures. The enhanced focusing is achieved by intentional bending of the PCB or bending of the PCB toward a flat or planar state to counter temperature induced bending of the PCB that would otherwise occur when exposed to higher or lower temperatures.

Figure 11:
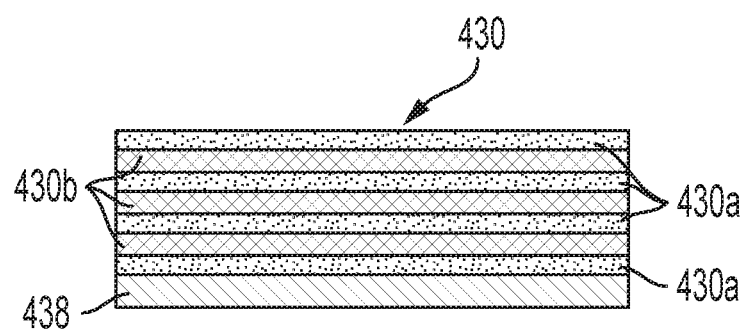
FIG. 11 is a side view diagram of another camera, showing a different CTE layer laminated or attached along a surface of the printed circuit board.
Figure 12:
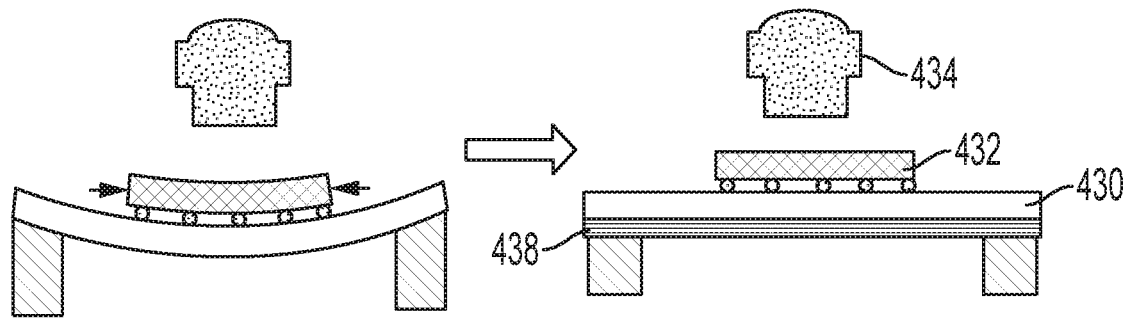
FIG. 12 is a side view of a printed circuit board with layers of metal and isolation layers, and with an added layer having a different CTE.

Optionally, a laminate layer with different CTE properties may be directly added to the PCB at one side or may be embedded inside and between the layers of the laminated PCB substrate. Such a laminate layer causes the PCB substrate to reduce or even reverse temperature-induced bending when the temperature changes. For example, and with reference to FIGS. 11 and 12, the PCB substrate 430 may comprise a plurality of metallic layers 430*a* separated by respective isolation layers 430*b* (such as, for example, layers of FR-4 glass-reinforced epoxy laminate material). As shown in FIGS. 11 and 12, an additional laminate layer 438 is disposed at the side or surface of the PCB substrate 430 that is opposite from the side or surface of the PCB substrate where the imager 432 is disposed or attached (such as via solder or the like).

By adding a layer of laminate material to one side of PCB, when the added layer has a lower CTE than the PCB's CTE, the PCB will bend due to the mis-match of CTEs. As can be seen with reference to FIG. 12, when a camera (without the added layer or other different CTE elements) is exposed to higher temperatures, the PCB substrate expands more than the imager and causes flexing or bending such that the imager is under focused (such as also shown in FIG. 3), but with the added layer 438 laminated or disposed at the opposite side of the PCB 430 from the imager 432, the layer (having a lower CTE than that of the PCB) controls or limits or reduces temperature-induced flexing or bending of the PCB and imager to maintain the desired or set focus for the imager 432 and lens 434.

The added laminate layer material may comprise, for example, a metal core (e.g., copper-invar-copper (CIC) or copper-molybdenum-copper (CMC), with a CTE of about 8 ppm/° C. or about 6 ppm/° C., respectively), or a Kevlar Thermount or Aramid laminate. A commonly used FR-4 PCB has a CTE of about 15 ppm/° C. The bending amount can be controlled and tuned by using different material (materials above are some examples) for the added layer.

Optionally, the added layer may be disposed at the imager side of the PCB. If the added layer is placed at the opposite side or imager side of the PCB, the PCB will bend to the opposite direction. The added layer can also be placed inside the PCB substrate, such as between the laminated layers of the substrate to control the amount of the PCB bending, since the position of the added layer (with different CTE) at the substrate effects the degree of bending it causes. For example, the closer to the center of the PCB that the added layer is disposed, the less bending it causes.

Optionally, more than one added layer (having a lower CTE than that of the other layers of the PCB substrate) may be added at the PCB substrate when the layers are separated by one or more metal conducting layers. These multiple low CTE layers can increase the PCB bending control effect. Optionally, the camera may utilize one or more layers with a larger CTE (than that of the other layers of the PCB substrate) at the PCB but at the opposite side of the PCB to achieve the same PCB bending control effect.

Optionally, the camera housing may be designed to assist in controlling flexing or bending of the PCB and imager relative to the lens. For example, and with reference to FIG. 13, the PCB 530 may be attached (such as via adhesive or fasteners or screws or the like) at the camera housing 528 at two or more angled stands or stanchions or posts 540 of the housing. In the illustrated embodiment of FIG. 13, the stanchions 540 are at the opposite side of the PCB 530 from the imager 532, such that, when the camera is exposed to higher temperatures, the plastic housing 528 expands more than the PCB, such that the PCB stands tilt more and bend the PCB and imager away from the lens 534 (which is attached at the camera housing 528 via adhesive 535 or the like) so that the imager is under focused at the lens 534. Optionally, and such as shown in FIG. 14, the stanchions 540' are at the same side of the PCB 530 as the imager 532, such that, when the camera is exposed to higher temperatures, the plastic housing 528' expands more than the PCB, such that the PCB stands tilt more and bend the PCB and imager toward the lens 534 so that the imager is over focused at the lens 534.

The adjustable PCB stands (such as two or four stands or stanchions or bosses or any number of stands or stanchions or bosses) that support the PCB at rear side or front side of the PCB and that attach to the PCB through screws or glue, control PCB bending when the temperature changes. This is because the plastic housing expands more than the PCB as the temperature rises, such that the stands or stanchions tilt and bend the PCB and imager as the temperature rises. Typically, the CTE of the PCB is smaller or less than the CTE of the plastic housing material, or bigger or larger than the CTE of the metal housing material. When the temperature changes, the PCB and the housing expand or contract in different amounts and thus cause the PCB to bend and cause the imager to move away from the lens focal plane such that the camera loses focus sharpness. The different height of the PCB stands can cause different PCB bending amounts (as taller PCB stands cause less PCB bending due to the smaller tangential forces applied to the PCB). If the height of the PCB stands are changeable in design, the PCB can bend in different amounts and/or in different direction by design to cancel or reduce focus movement caused by other elements (e.g., the lens focal plane moves and glue height changes during temperature changes).

Figure 13:
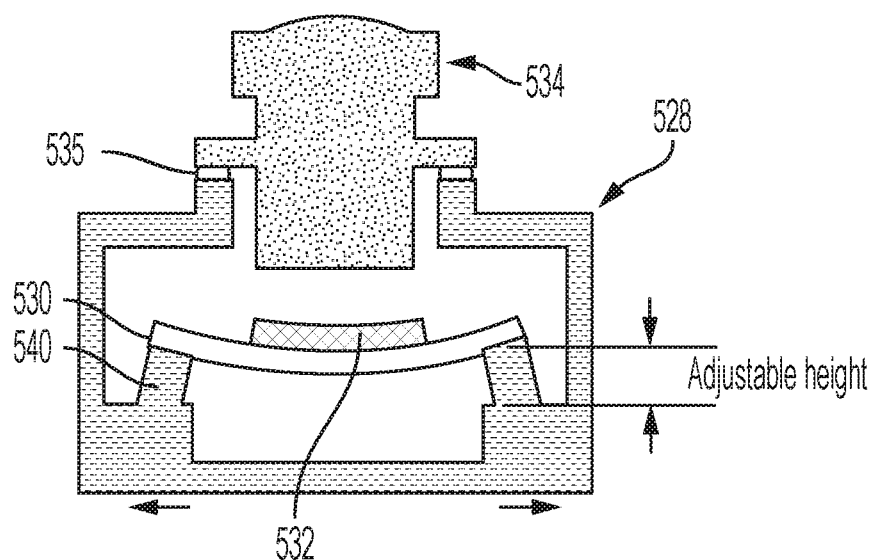
FIG. 13 is a side view diagram of another camera, showing the housing with angled PCB stands at the underside of the printed circuit board such that expansion of the housing causes bending or flexing of the printed circuit board.
Figure 14:
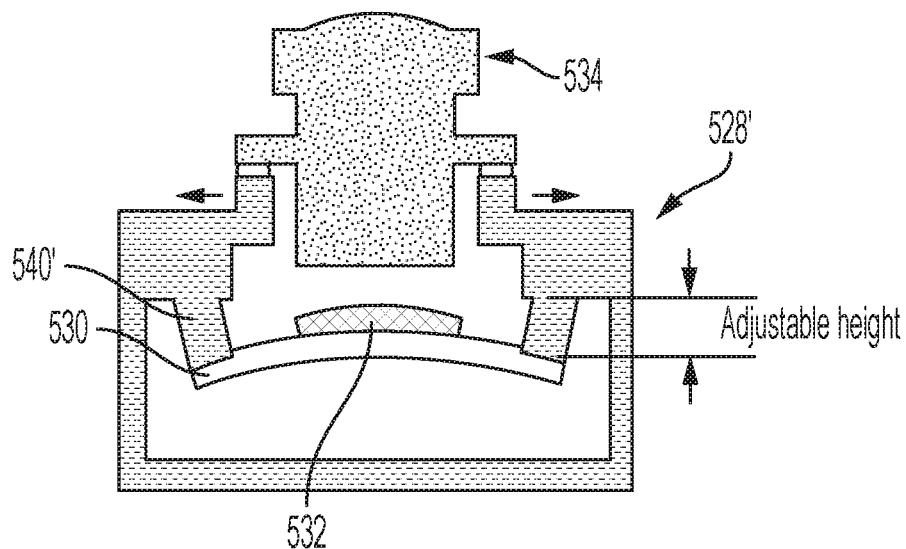
FIG. 14 is another side view diagram of another camera, showing the housing with angled PCB stands at the imager side of the printed circuit board.

As shown in FIG. 13, the PCB stands may protrude from the rear housing and engage the PCB at its rear side, which bends the PCB and moves the imager further away from lens when the temperature rises. As shown in FIG. 14, the PCB stands may protrude from the front part of the housing and engage the PCB at its front or imager side, which bends the PCB and moves the imager closer toward lens when the temperature rises. As can be seen with reference to FIGS. 13 and 14, the height of the PCB stands 540, 540' can be adjusted by moving up or down from the plateau (the rear or front of the housing) that supports the PCB stand. Such a height adjustment of the stands or stanchions (and thus an adjustment of the degree of bending of the PCB as the temperature rises) can be a relatively simple change to the housing injection molding tools after a camera sample is tested and the amount of desired PCB bending change is known. Thus, various sizes of the stands or stanchions can be tested and a particular size (including length and cross dimension and/or shape) stand or stanchion can be selected to provide the desired or appropriate degree of bending of the PCB to effectively counter the temperature-induced bending of the PCB when the camera is exposed to extreme temperatures above or below a nominal range of temperatures (such as between about 0 degrees C. and about 40 degrees C. or thereabouts).

The camera module may utilize aspects of the cameras and connectors described in U.S. Pat. Nos. 9,621,769; 9,277,104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0054881; US-2017-0133811; US-2017-0201661; US-2017-0280034; US-2017-0295306; US-2017-0302829; US-2018-0098033; US-2019-0121051; US-2019-0124238 and/or US-2019-0124243, which are hereby incorporated herein by reference in their entireties.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Aspects of the camera(s) may be suitable for use on other sensors of the vehicle system, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vehicular vision system, said camera configured to be disposed at a vehicle so as to have a field of view exterior of the vehicle, said camera comprising:
   a circuit board having a first side and a second side opposite said first side and separated from said first side by a thickness dimension of said circuit board, said circuit board having a first coefficient of thermal expansion (CTE);
   an imager disposed at said first side of said circuit board;
   a lens assembly optically aligned with said imager, said lens assembly accommodating at least one lens in focus at said imager;
   a bend-countering element disposed at one of said first and second sides of said circuit board, said bend-countering element having a second CTE that is different from the first CTE of said circuit board;
   wherein said bend-countering element is selected so that, with said camera disposed at the vehicle, said bend-countering element counters temperature-induced bending of said circuit board to maintain focus of said at least one lens at the imager;
   wherein, when said camera is disposed at the vehicle and exposed to a high temperature greater than 40 degrees C. or a low temperature less than −20 degrees C., said bend-countering element bends in an opposite direction that said circuit board bends to at least partially counter the temperature-induced bending of said circuit board; and
   wherein said bend-countering element comprises at least one strip of solder disposed at said first side of said circuit board.

2. The camera of claim 1, wherein the second CTE of said at least one strip of solder is greater than the first CTE of said circuit board.

3. The camera of claim 1, wherein said bend-countering element functions to counter temperature-induced bending of said circuit board to bend said circuit board toward a planar configuration to maintain focus of said at least one lens at said imager.

4. The camera of claim 1, wherein said bend-countering element functions to counter temperature-induced bending of said circuit board to bend the circuit board a selected amount to maintain focus of said at least one lens at said imager throughout exposure of said camera to a range of temperatures between −40 degrees C. and 60 degrees C.

5. A camera for a vehicular vision system, said camera configured to be disposed at a vehicle so as to have a field of view exterior of the vehicle, said camera comprising:
   a circuit board having a first side and a second side opposite said first side and separated from said first side by a thickness dimension of said circuit board, said circuit board having a first coefficient of thermal expansion (CTE);
   an imager disposed at said first side of said circuit board;
   a lens assembly optically aligned with said imager, said lens assembly accommodating at least one lens in focus at said imager;
   a bend-countering element disposed at one of said first and second sides of said circuit board, said bend-countering element having a second CTE that is different from the first CTE of said circuit board;
   wherein said bend-countering element is selected so that, with said camera disposed at the vehicle, said bend-countering element counters temperature-induced bending of said circuit board to maintain focus of said at least one lens at the imager; and wherein said bend-countering element comprises a low CTE plate disposed at said second side of said circuit board.

6. The camera of claim 5, wherein the second CTE of said low CTE plate is less than the first CTE of said circuit board.

7. A camera for a vehicular vision system, said camera configured to be disposed at a vehicle so as to have a field of view exterior of the vehicle, said camera comprising:
a circuit board having a first side and a second side opposite said first side and separated from said first side by a thickness dimension of said circuit board, said circuit board having a first coefficient of thermal expansion (CTE);
an imager disposed at said first side of said circuit board;
a lens assembly optically aligned with said imager, said lens assembly accommodating at least one lens in focus at said imager;
a bend-countering element disposed at one of said first and second sides of said circuit board, said bend-countering element having a second CTE that is different from the first CTE of said circuit board;
wherein said bend-countering element is selected so that, with said camera disposed at the vehicle, said bend-countering element counters temperature-induced bending of said circuit board to maintain focus of said at least one lens at the imager; and
wherein said bend-countering element comprises a laminate layer laminated at said circuit board, and wherein the second CTE of said laminate layer is less than the first CTE of other layers of said circuit board.

8. The camera of claim 7, wherein, when said camera is disposed at the vehicle and exposed to a high temperature greater than 40 degrees C. or a low temperature less than −20 degrees C., said bend-countering element bends in an opposite direction that said circuit board bends to at least partially counter the temperature-induced bending of said circuit board.

9. The camera of claim 7, comprising a housing that houses said circuit board and said imager.

10. The camera of claim 7, comprising a thermal element operable to actively heat or cool said circuit board.

11. A camera for a vehicular vision system, said camera configured to be disposed at a vehicle so as to have a field of view exterior of the vehicle, said camera comprising:
a circuit board having a first side and a second side opposite said first side and separated from said first side by a thickness dimension of said circuit board, said circuit board having a first coefficient of thermal expansion (CTE);
an imager disposed at said first side of said circuit board;
a lens assembly optically aligned with said imager, said lens assembly accommodating at least one lens in focus at said imager;
a bend-countering element disposed at one of said first and second sides of said circuit board, said bend-countering element having a second CTE that is different from the first CTE of said circuit board;
a housing that houses said circuit board and said imager;
wherein said bend-countering element is selected so that, with said camera disposed at the vehicle, said bend-countering element counters temperature-induced bending of said circuit board to maintain focus of said at least one lens at the imager; and
wherein said bend-countering element comprises at least two stanchions at said housing, and wherein said circuit board is attached at said stanchions, and wherein, when said camera is disposed at the vehicle and exposed to a high temperature greater than 40 degrees C., said housing expands and said stanchions tilt and bend said circuit board to counter temperature-induced bending of said circuit board.

12. The camera of claim 11, wherein said stanchions attach at the second side of said circuit board opposite from the first side at which said imager is disposed, and wherein, when said camera is disposed at the vehicle and exposed to the high temperature, said housing expands and said stanchions tilt and bend said circuit board to move a center region of said imager away from said at least one lens.

13. The camera of claim 11, wherein said stanchions attach at the first side of said circuit board at which said imager is disposed, and wherein, when said camera is disposed at the vehicle and exposed to the high temperature, said housing expands and said stanchions tilt and bend said circuit board to move a center region of said imager toward said at least one lens.

14. A camera for a vehicular vision system, said camera configured to be disposed at a vehicle so as to have a field of view exterior of the vehicle, said camera comprising:
a circuit board having a first side and a second side opposite said first side and separated from said first side by a thickness dimension of said circuit board, said circuit board having a first coefficient of thermal expansion (CTE);
an imager disposed at said first side of said circuit board;
a lens assembly optically aligned with said imager, said lens assembly accommodating at least one lens in focus at said imager;
a bend-countering element disposed at one of said first and second sides of said circuit board, said bend-countering element having a second CTE that is different from the first CTE of said circuit board;
wherein said bend-countering element is selected so that, with said camera disposed at the vehicle, said bend-countering element counters temperature-induced bending of said circuit board to maintain focus of said at least one lens at the imager;
a thermal element operable to actively heat or cool said circuit board; and
wherein said thermal element is operable to change the temperature of at least said circuit board to adjust focus of said at least one lens at said imager.

15. A camera for a vehicular vision system, said camera configured to be disposed at a vehicle so as to have a field of view exterior of the vehicle, said camera comprising:
a circuit board having a first side and a second side opposite said first side and separated from said first side by a thickness dimension of said circuit board, said circuit board having a first coefficient of thermal expansion (CTE);
an imager disposed at said first side of said circuit board;
a lens assembly optically aligned with said imager, said lens assembly accommodating at least one lens in focus at said imager;
a bend-countering element disposed at one of said first and second sides of said circuit board, said bend-countering element having a second CTE that is different from the first CTE of said circuit board;
wherein said bend-countering element is selected so that, with said camera disposed at the vehicle, said bend-countering element counters temperature-induced bending of said circuit board to bend said circuit board toward a planar configuration to maintain focus of said at least one lens at the imager;

wherein said bend-countering element functions to counter temperature-induced bending of said circuit board to bend the circuit board a selected amount to maintain focus of said at least one lens at said imager throughout exposure of said camera to a range of temperatures between −40 degrees C. and 60 degrees C.; and wherein said bend-countering element comprises at least one strip of solder disposed at said first side of said circuit board, and wherein the second CTE of said at least one strip of solder is greater than the first CTE of said circuit board.

16. A camera for a vehicular vision system, said camera configured to be disposed at a vehicle so as to have a field of view exterior of the vehicle, said camera comprising:

a circuit board having a first side and a second side opposite said first side and separated from said first side by a thickness dimension of said circuit board, said circuit board having a first coefficient of thermal expansion (CTE);

an imager disposed at said first side of said circuit board;

a lens assembly optically aligned with said imager, said lens assembly accommodating at least one lens in focus at said imager;

a bend-countering element disposed at one of said first and second sides of said circuit board, said bend-countering element having a second CTE that is different from the first CTE of said circuit board;

wherein said bend-countering element is selected so that, with said camera disposed at the vehicle, said bend-countering element counters temperature-induced bending of said circuit board to bend said circuit board toward a planar configuration to maintain focus of said at least one lens at the imager;

wherein said bend-countering element functions to counter temperature-induced bending of said circuit board to bend the circuit board a selected amount to maintain focus of said at least one lens at said imager throughout exposure of said camera to a range of temperatures between −40 degrees C. and 60 degrees C.; and wherein said bend-countering element comprises a low CTE plate disposed at said second side of said circuit board, and wherein the second CTE of said low CTE plate is less than the first CTE of said circuit board.

17. A camera for a vehicular vision system, said camera configured to be disposed at a vehicle so as to have a field of view exterior of the vehicle, said camera comprising:

a circuit board having a first side and a second side opposite said first side and separated from said first side by a thickness dimension of said circuit board, said circuit board having a first coefficient of thermal expansion (CTE);

an imager disposed at said first side of said circuit board;

a lens assembly optically aligned with said imager, said lens assembly accommodating at least one lens in focus at said imager;

a bend-countering element disposed at one of said first and second sides of said circuit board, said bend-countering element having a second CTE that is different from the first CTE of said circuit board;

wherein said bend-countering element is selected so that, with said camera disposed at the vehicle, said bend-countering element counters temperature-induced bending of said circuit board to bend said circuit board toward a planar configuration to maintain focus of said at least one lens at the imager;

wherein said bend-countering element functions to counter temperature-induced bending of said circuit board to bend the circuit board a selected amount to maintain focus of said at least one lens at said imager throughout exposure of said camera to a range of temperatures between −40 degrees C. and 60 degrees C.; and wherein said bend-countering element comprises a laminate layer laminated at said circuit board, and wherein the second CTE of said laminate layer is less than the first CTE of other layers of said circuit board.

18. A camera for a vehicular vision system, said camera configured to be disposed at a vehicle so as to have a field of view exterior of the vehicle, said camera comprising:

a circuit board having a first side and a second side opposite said first side and separated from said first side by a thickness dimension of said circuit board, said circuit board having a first coefficient of thermal expansion (CTE);

an imager disposed at said first side of said circuit board;

a lens assembly optically aligned with said imager, said lens assembly accommodating at least one lens in focus at said imager;

a bend-countering element disposed at one of said first and second sides of said circuit board, said bend-countering element having a second CTE that is different from the first CTE of said circuit board;

wherein said bend-countering element is disposed at said second side of said circuit board and the second CTE of said bend-countering element is less than the first CTE of said circuit board;

wherein said bend-countering element is selected so that, with said camera disposed at the vehicle, said bend-countering element counters temperature-induced bending of said circuit board to maintain focus of said at least one lens at the imager; and wherein, when said camera is disposed at the vehicle and exposed to a high temperature greater than 40 degrees C. or a low temperature less than −20 degrees C., said bend-countering element bends in an opposite direction that said circuit board bends to at least partially counter the temperature-induced bending of said circuit board.

19. The camera of claim 18, wherein said bend-countering element functions to counter temperature-induced bending of said circuit board to bend said circuit board toward a planar configuration to maintain focus of said at least one lens at said imager.

20. The camera of claim 18, wherein said bend-countering element functions to counter temperature-induced bending of said circuit board to bend the circuit board a selected amount to maintain focus of said at least one lens at said imager throughout exposure of said camera to a range of temperatures between −40 degrees C. and 60 degrees C.

* * * * *